Jan. 7, 1964     D. K. SKOOG     3,116,617
FLUID IMPULSE TORQUE TOOL
Filed Dec. 12, 1961     7 Sheets-Sheet 1
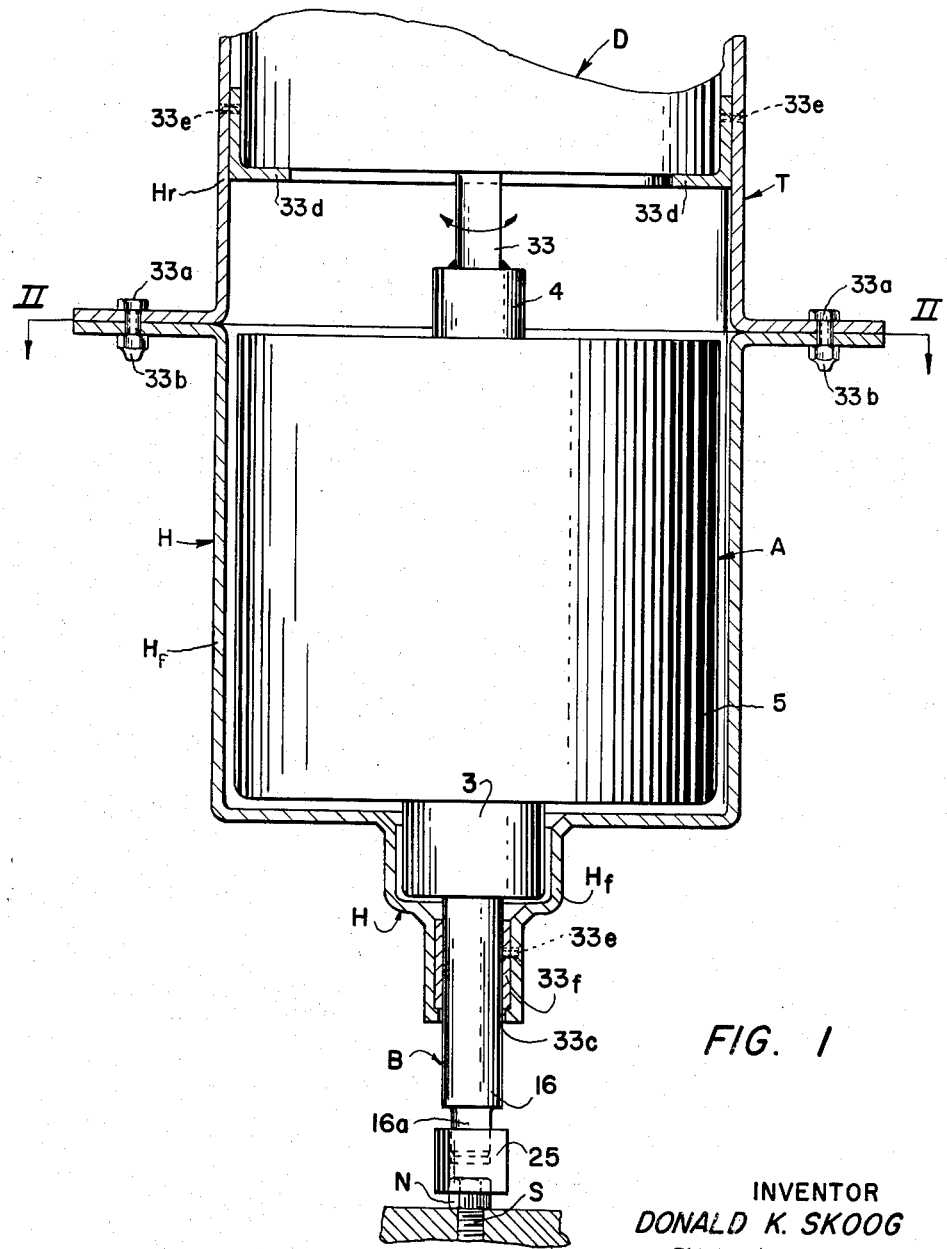
FIG. 1
INVENTOR
DONALD K. SKOOG
BY 
HIS ATTORNEY Jan. 7, 1964  D. K. SKOOG  3,116,617
FLUID IMPULSE TORQUE TOOL
Filed Dec. 12, 1961  7 Sheets-Sheet 2

INVENTOR
DONALD K. SKOOG
BY
HIS ATTORNEY

INVENTOR
DONALD K. SKOOG
BY
HIS ATTORNEY

Jan. 7, 1964

D. K. SKOOG 3,116,617

FLUID IMPULSE TORQUE TOOL

Filed Dec. 12, 1961

INVENTOR
DONALD K. SKOOG
BY
HIS ATTORNEY

Jan. 7, 1964  D. K. SKOOG  3,116,617
FLUID IMPULSE TORQUE TOOL
Filed Dec. 12, 1961  7 Sheets-Sheet 6
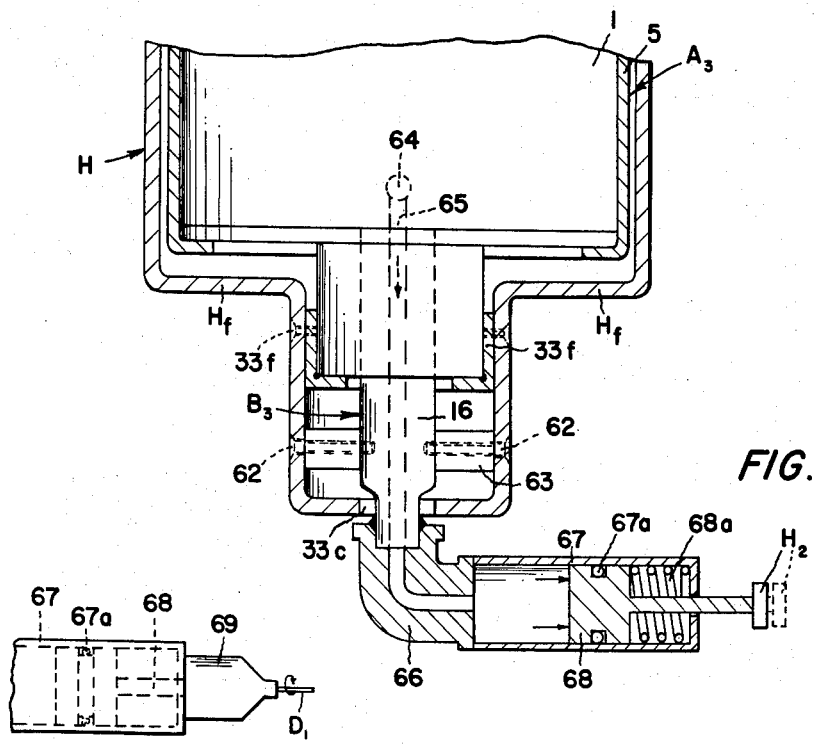
FIG. 15
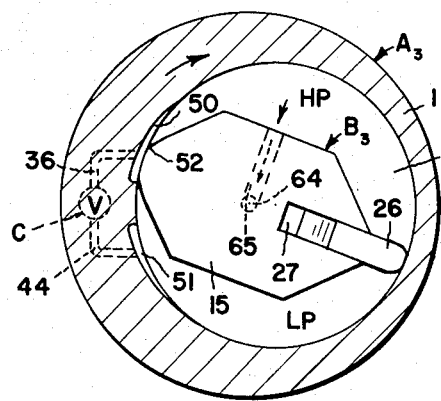
FIG. 17
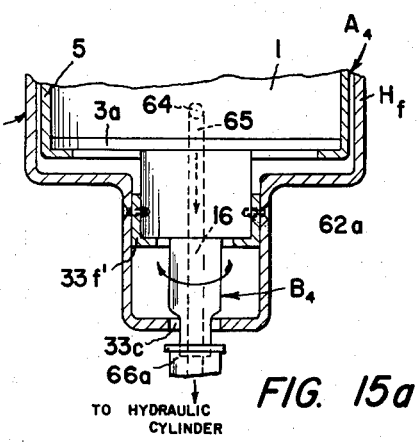
FIG. 15a
FIG. 16
INVENTOR
DONALD K. SKOOG
BY
HIS ATTORNEY United States Patent Office 3,116,617
Patented Jan. 7, 1964

3,116,617
FLUID IMPULSE TORQUE TOOL
Donald K. Skoog, Stamford, Conn., assignor to Ingersoll-Rand Company, New York, N.Y., a corporation of New Jersey
Filed Dec. 12, 1961, Ser. No. 158,838
24 Claims. (Cl. 64—26)

The present invention relates to power tools and, more particularly, to an improved torque tool of the impulse type. This application is a continuation-in-part of U.S. patent application, Serial No. 115,714, filed June 8, 1961, by D. K. Skoog and entitled Power Tool.

Heretofore, conventional portable, power operated tools for driving nuts, bolts and screws or for applying a torque to other objects have been of the stall, clutch and impact type. While the stall type and clutch type tools give satisfactory torque control in most applications, these types are larger and hence heavier than the impact type tool. Further the stall type and clutch type tools are slower in operation than the impact type tool. In addition the stall type and clutch type tools provide an undesirable torque reaction to the operator, which torque reaction is not present in a tool of the impact type.

In the impact type of tool the kinetic energy of the rotary hammer (of large mass) is transferred to the spindle (of relatively lower mass) by a collision between the jaws of the hammer and the spindle. These conventional impact tools have several limitations. First the rigid jaws of the hammer and the similar jaws of the spindle are relatively light in order to satisfy the demand of the fabricating industries for a light portable tool. However the forces between the jaws of the hammer and the jaws of the spindle are very high during the time of impact therebetween, with resultant breakage or failure of such jaws and a shorter service life than in other conventional power tools, such as those of the stall or clutch types. Secondly, with these conventional impact tools it is very difficult to control or limit the final torque on a threaded fastener to a final predetermined value within satisfactory limits of accuracy. Further the impact tools are difficult to manufacture because of their complicated structure and are rather noisy in their operation.

It is the general object of the present invention to avoid and overcome the foregoing and other difficulties of and objections to prior art practices by the provision of an improved tool of the impulse type which tool has all of the advantages of the stall type, clutch type and impact type tools and none of the disadvantages thereof.

A further object of the present invention is the provision of an impulse type tool which operates in a fluid at low force levels with resultant minimum wear and attendant longer service life than conventional impact tools.

Another object of the present invention is the provision of an impulse tool which is operable to control the final torque on a threaded fastener accurately and precisely within predetermined limits.

Still another object of the present invention is the provision of an impulse tool which, because of the simplicity of its structure, is easy to manufacture.

Yet another object of the present invention is the provision of an impulse tool which provides relatively quiet operation as compared to an impact tool.

A further object of the present invention is the provision of an improved tool of the impulse type, the major elements of which tool act to seal dynamically or at high velocity and function as a valve statically or at low velocity.

A still further object of the present invention is the provision of an impulse tool which is lighter in weight and faster in operation than the tools of the stall type and clutch type.

Another object of the present invention is the provision of a tool operable as a source of impulses, which impulses can be utilized to drive a conventional reciprocating tool, such as a hammer, or a conventional rotary tool, such as a drill.

A further object of the present invention is the provision of an impulse tool which is operable to apply a torque or a series of impulses at an angle with respect to the longitudinal axis of the impulse tool.

The aforesaid objects of the present invention and other objects which will become apparent as the description proceeds are achieved by providing an impulse tool for applying a predetermined torque to an object. This impulse tool comprises housing means adapted to contain a fluid, a spindle means rotatable in the housing means and in the fluid and adapted to engage the object, and drive means connected to the housing means for rotating the housing means with respect to the object and the spindle means. The spindle means is operable during a portion of each revolution of the housing means to dynamically seal off a portion of said fluid so that the pressure in the portion of the fluid and on the spindle means increases, thus causing the spindle means to rotate with respect to the housing means and to apply a torque to the object. Alternatively the spindle means is connected to the drive means and the housing means is adapted to engage the object. In addition, the spindle means is affixed to a stationary casing means and the impulses generated within the housing means are transmitted by means of passage means in the spindle means and through a flexible but rigid coupling means to a conventional tool. Alternatively the housing means is secured to the stationary casing means and the impulses are transmitted through passage means in the housing means.

For a better understanding of the present invention reference should be had to the accompanying drawings, wherein like numerals of reference indicate similar parts throughout the several views and wherein:

FIG. 1 is a side elevational view of the improved tool of the impulse type, shown in engagement with a threaded fastener and with a stationary casing means shown in vertical section;

FIGS. 15, 15a and 15b are fragmentary side elevational views partially in section illustrating the use of the impulse type tool as a source of impulses for operating a conventional tool, such as a hammer;

FIGS. 16 and 16a are views similar to FIG. 12 showing the flow of the fluid from the high pressure portion of the cavity through passage means in the spindle means and through passage means in the housing means respectively;

FIG. 17 is a fragmentary side elevational view of an alternative embodiment of the tool shown in FIG. 15.

Figure 2:
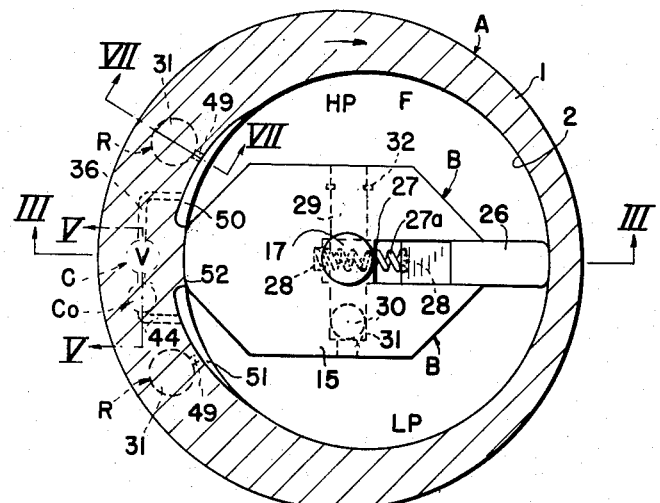
FIG. 2 is a horizontal sectional view on a slightly reduced scale along the line II—II of FIG. 1 in the direction of the arrows with the stationary casing means and a cylinder casing removed for clarity and showing a spindle means of the improved tool at the midpoint of the dynamic sealing portion of its rotary path of movement.

While the impulse tool of the present invention may be advantageously employed for applying a torque to objects and as a source of fluid impulses in general, the impulse tool of the present invention is particularly adapted for use in conjunction with applying a torque to a threaded fastener and as a source of fluid impulses for driving a conventional tool and hence it has been so illustrated and will be so described.

With specific reference to the form of the present invention illustrated in the drawings, and referring particularly to FIG. 1, the impulse tool of the present invention is indicated generally by the reference letter T.

As shown in FIG. 1 this impulse tool T has a housing means A adapted to contain a fluid, such as oil F.

Housing Means

In order to contain the oil F, the housing means A has a cylindrical bushing 1 (FIGS. 2 and 3) provided with an eccentrically disposed cavity 2 in which the oil F is disposed. The means utilized to retain the oil F within the cavity 2 comprises a front end cap 3 (FIG. 3) and rear end cap 4 compressed against the bushing 1 by means of a flanged cylinder casing 5 (the flanged end of which engages the front end cap 3) and an annular casing nut 6 in threadable engagement with the unflanged end of the cylinder casing 5. For the purpose of sealingly containing the oil F in the housing means A by sealing the abutting surfaces of the bushing 1 and the rear end cap 4 and the bushing 1 and the front end cap 3, a rear cylinder seal, such as the O-ring 7, and a front cylinder seal, such as the O-ring 8, respectively, are utilized.

Figures 3, 4:
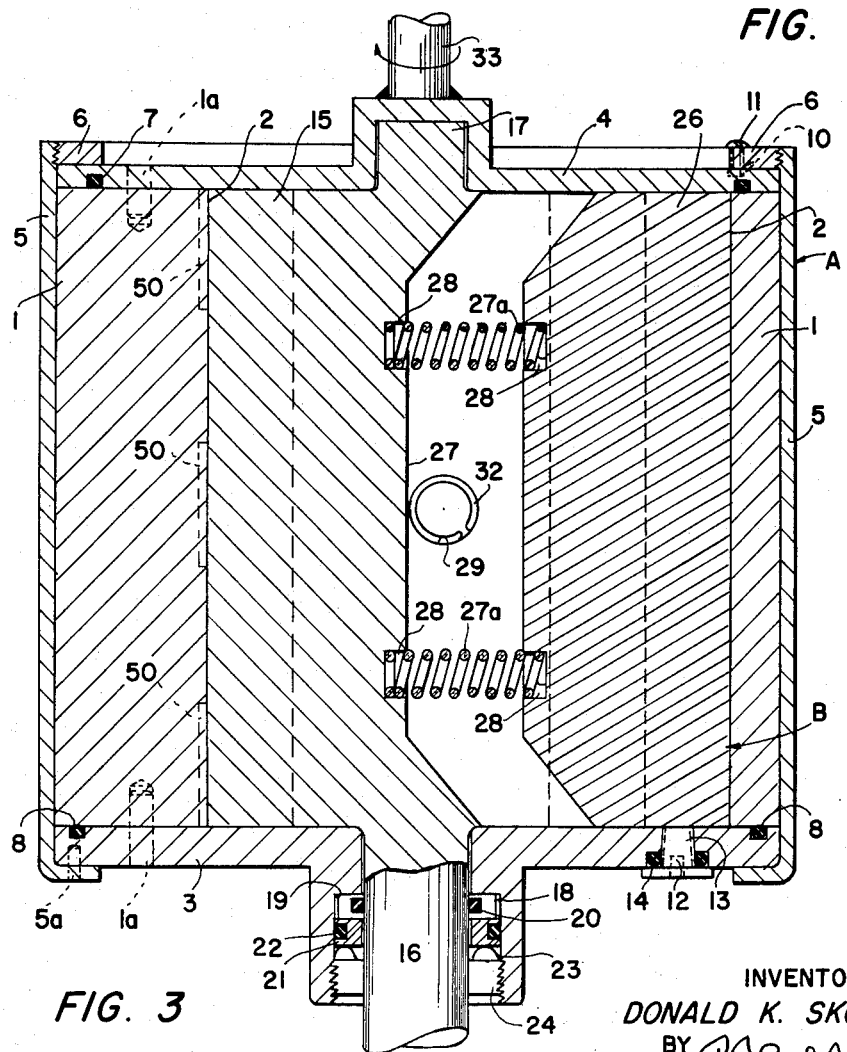
FIG. 3 is a vertical sectional view along the line III—III of FIG. 2 in the direction of the arrows with the reservoir means and valve means omitted for clarity.
FIG. 4 is a fragmentary plan view illustrating the locking means for securing a rear end cap to a casing nut.

In order to lock the casing nut 6 in the desired position, the casing nut 6 is provided with a plurality of slots 9 (FIG. 4) on its inner periphery and when one of such slots 9 is aligned with a threaded hole 10 (FIG. 3) in the rear end cap 4, a screw 11 is inserted into the registering slot 9 and hole 10 and threaded into the latter. As shown in FIG. 3, a locking pin 5a prevents relative rotary movement between the cylinder casing 5 and front end cap 3. In addition, alignment pins 1a prevent relative rotary movement between the cylinder bushing 1 and front end cap 3 and between the cylinder bushing 1 and rear end cap 4.

The means utilized to fill the cavity 2 with the oil F comprises a filler plug 12 threaded into a drainage hole 13 in the front end cap 3 and sealed to the front end cap 3 by means of a filler plug seal, such as an O-ring 14.

Within the housing means A, a spindle means B (FIGS. 1, 2 and 3) is rotatable in the housing means A and in the oil F and is adapted to engage (FIG. 1) an object, such as a nut N on a bolt S, to apply a predetermined torque thereto.

Spindle Means

This spindle means B has a spindle 15 (FIG. 3) which has a front shaft portion 16 journaled in the front end cap 3 and a rear shaft portion 17 journaled in the rear end cap 4. The axes of the front shaft portion 16 and rear shaft portion 17 coincide with the axis of rotation of the housing means A.

To provide a rotary seal between the front shaft portion 16 and the front end cap 3, a rear spindle seal ring 18 (which rotates with front shaft portion 16) is disposed in a sealing cavity 19 in the front end cap 3 and is sealed by a rear spindle seal, suitably an O-ring 20, and secured to the front shaft portion 16. A front spindle seal ring 21 (which rotates with the front end cap 3) is sealed by a front spindle seal, suitably an O-ring 22, and secured to the front end cap 3. The rings 18 and 21 are compressed together by a spring washer 23 and a spindle seal retainer 24 in threadable engagement with the front end cap 3 to provide a mechanical face seal between the rings 18 and 21.

So that the spindle means B may engage the nut N (FIG. 1), the front shaft portion 16 having a squared drive 16a carries a socket 25, contoured to receive the nut N. As shown in FIGS. 2 and 3, sealing means, such as a spindle blade 26, is reciprocable in a slot 27 in the spindle 15 and is biased by means of springs 27a (FIG. 3) against the side wall of the cavity 2. The springs 27a are contained in holes 28 in the spindle 15 and in the spindle blade 26.

As shown in FIG. 2, the spindle 15 is provided with reverse valve means for permitting the flow of the oil F into and out of the slot 27 or space behind the spindle blade 26.

This reverse valve means comprises a reverse ball passage 29 (FIGS. 2 and 3) adapted to contain a reverse ball 30 by means of a shoulder 31 and a reverse ball retainer 32, the reverse ball passage 29 being in communication with the slot 27 (i.e. the space behind the spindle blade 26, FIG. 3).

To provide means for rotating the housing means A with respect to the nut N and the spindle means B, the impulse tool T (FIG. 1) is provided with drive means (FIG. 1).

Drive Means

This drive means is suitably any source of rotary power, such as an air motor D, having its output shaft 33 connected to the rear end cap 4 of the housing means A and is utilized for rotating the latter in either direction, as for example the clockwise direction indicated in FIGS. 1 and 2 by the arrows.

As shown in FIG. 1, the housing means A and the air motor D are contained within a stationary casing means H, suitably comprising two flanged members Hf and Hr, which flanged members (a front flanged member Hf and a rear flanged member Hr) are secured together by a plurality of spaced bolts 33a and nuts 33b. The front shaft portion 16 of the spindle means B projects through a clearance aperture 33c in the front flanged member Hf. The means utilized to centralize the air motor D in the rear flanged member Hr comprises a removable insert 33d secured to the rear flanged member Hr by screws 33e. The front flanged member Hf carries a bushing 33f which centralizes the front shaft portion 16 (FIG. 1), of the spindle means B and permits the substantially frictionless rotation of such spindle means B therein.

Before proceeding with a description of the operation of the impulse tool T (FIG. 1), it is deemed necessary to describe a relief valve means (FIGS. 5 and 6) for relieving the pressure in the cavity 2 (as hereinafter explained) when such pressure reaches a predetermined value which corresponds to a desired torque on the nut N.

Pressure Relief Means

Figure 5:
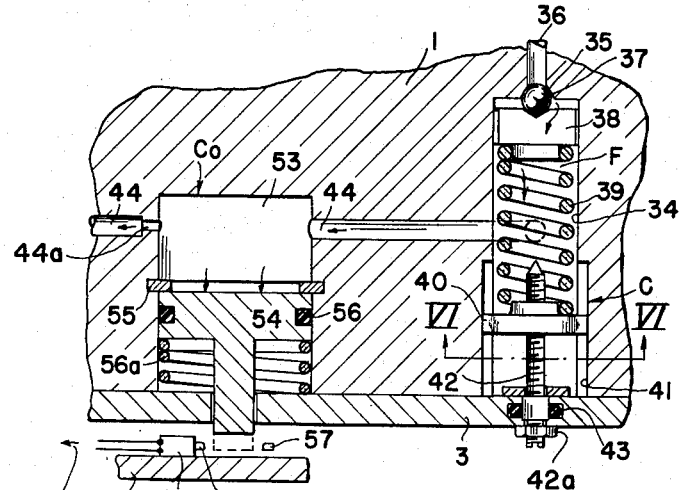
FIG. 5 is a fragmentary vertical sectional view along the line V—V of FIG. 2 in the direction of the arrows of the relief valve means and an associted cut-out means.
Figure 6:
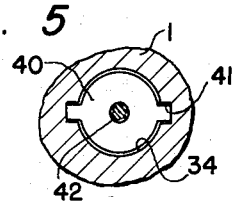
FIG. 6 is a fragmentary horizontal sectional along the line VI—VI of FIG. 5 in the direction of the arrows illustrating the keying of a relief valve spring plate in a cylinder bushing.

While the pressure relief means may have many forms, one suitable form identified generally by the reference letter C is shown in FIGS. 5 and 6. This pressure relief means C is provided with a relief valve cavity 34 in the bushing 1, which cavity 34 has a relief valve seat 35 adjacent a relief valve inlet passage 36 (FIGS. 2 and 5) on which a relief valve ball 37 is normally seated.

The relief valve inlet passage 36 is in communication with the high pressure side of the cavity 2. Disposed below the relief valve ball 37 is a relief valve ball cap 38 biased by a relief valve spring 39 and a spring compression control means to the position shown in FIG. 5 against the relief valve ball 37.

This spring compression control means has a relief valve spring plate 40 which engages the relief valve spring 39 and is keyed in a slot 41 (FIG. 6) in the bushing 1 for reciprocable movement by means of a relief valve positioning screw 42 which is rotatably retained in the front end cap 3 and sealed thereto by means of a relief valve seal, suitably an O-ring 43.

By turning the relief valve position screw 42 to raise the relief valve spring plate 40, the pressure (and hence the corresponding maximum torque on the nut N) at which the pressure relief means C will open is increased. The adjusted relief valve positioning screw 42 is then secured in the adjusted position by a lock nut 42a.

As shown in FIGS. 2 and 5, a relief valve outlet passage 44 connects the cavity 34 with the low pressure side of the cavity 2.

In order to supply additional oil F to the cavity 2 in the event of leakage of oil F therefrom and to limit the static pressure in the cavity 2 (if thermal expansion or contraction occurs) a pair of reservoir means R (FIG. 2) are employed.

Reservoir Means

Each reservoir means R is provided with a reservoir cavity 45 in the bushing 1, in which cavity 45 a reservoir piston 46 is biased by a spring 47 into engagement with the oil F and is sealed against the sidewalls of the cavity 45 by means of a reservoir seal, such as an O-ring 48.

Figure 7:
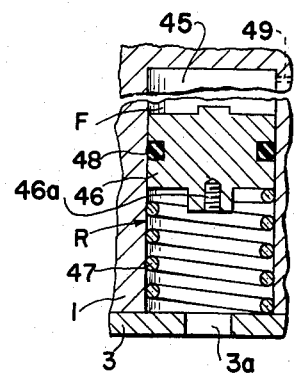
FIG. 7 is an enlarged fragmentary vertical sectional view along the line VII—VII of FIG. 2 in the direction of the arrows of one of the reservoir means.

To prevent the reservoir means R from interfering with the variable and rapidly changing pressure conditions within the cavity 2 during operation of the impulse tool T, a reservoir orifice 49 (which connects the cavities 45 and 2) is suitably of small and flow limiting diameter. In order to fill the reservoir cavity 45 with fluid F when the tool T is assembled, a long screw (not shown) is inserted through hole 3a and is threaded into a threaded hole 46a. The long screw (not shown) and the reservoir piston 46 are pulled downwardly, as viewed in FIG. 7, thus permitting fluid F to flow through reservoir orifice 49 and into the reservoir cavity 45 to fill the latter.

Figure 11:
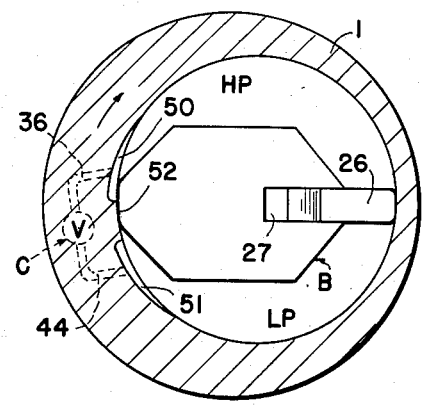

So that the housing means A will not appreciably decelerate as such housing means A approaches the position shown in FIG. 2 and 11 and will quickly accelerate as it leaves the position shown in FIG. 2, the bushing 1 is suitably undercut at 50 and 51. Referring to FIG. 3 wherein a plurality of the spaced undercuts 50 are provided in the bushing 1, it will be appreciated that the undercuts 51 are similarly disposed.

Operation

Assume (for purposes of illustration) that the spindle means B and housing means A are in the positions shown in FIG. 2 and spindle means B is in engagement with the nut N when the air motor D is actuated by closure of a throttle or trigger switch (not shown) by the operator (not shown). At the start of operation of the oil F in cavity 2 is divided by the spindle blade 26 and a first sealing portion on the housing means A (between undercuts 50, 51) and a second sealing portion, such as a shank portion 52 of the spindle 15, into, a high pressure portion HP and a low pressure portion LP.

Figure 8:
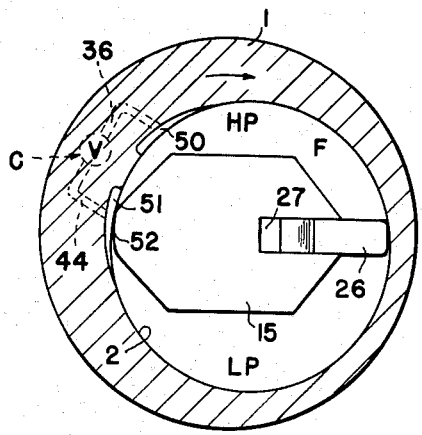
FIGS. 8–12 are diagrammatic plan views similar to (but on a smaller scaler than) FIG. 2 illustrating the operation of the impulse tool.
Figure 9:
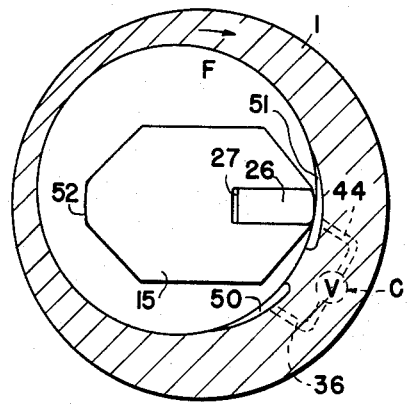
Figure 10:
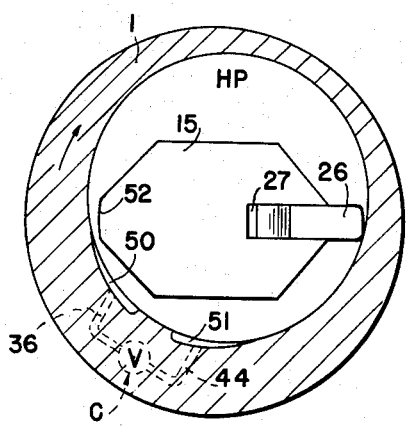
Figure 12:
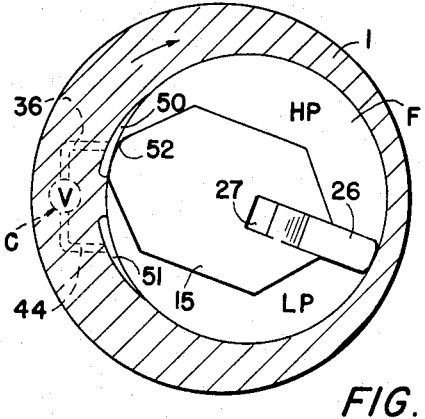

As the housing means A (having a relatively larger mass as compared with the spindle means B) rotates (about 30°) in clockwise direction (with respect to the spindle means B) from the position shown in FIG. 2 to the position shown in FIG. 8, the shank portion 52 encounters the undercut 51 and oil F flows rapidly around such shank portion 52 with attendant rapid acceleration of the housing means A. When the housing means A has reached the position shown in FIG. 9 (about 180° later) oil F is passing freely between the spindle 15 and the cylinder bushing 1 due to their eccentric relationship. While the housing means A is moving through the position shown in FIG. 10 and approaching the position shown in FIG. 11, the undercut 50 prevents deceleration of such housing means A. After almost one revolution of the housing means A (about 351°) and as shown in FIG. 11, clearance between the shank portion 52 and the cylinder bushing 1 is reduced to a minimum and the pressure in the now formed (and dynamically sealed) portion HP in the cavity 2 rises very rapidly. While the housing means A tends to decelerate, the increased pressure on the spindle blade 26 and the spindle 15 rotates the spindle means B in clockwise direction (as shown in FIG. 12) with attendant tightening of the nut N.

As there is a definite static leakage between the shank portion 52 of the spindle 15 and the bushing 1, around the spindle blade 26 and between the front end cap 3 and rear end cap 4, the torque of the air motor D causes the housing means A to rotate past the sealed positions (FIGS. 2, 11 and 12) and to start the acceleration phase of the next revolution or cycle of operation of the impulse tool T. Thereafter the impulse tool T operates through a series of successive impulses until the final predetermined torque of the nut N is attained thereon precisely and accurately.

Since the torque applied by the spindle means B to the nut N is proportional to the pressure in the portion HP of the cavity 2 during the dynamic sealing phase of the cycle of operation of the impulse tool T, the pressure relief means C is adjusted so that when maximum pressure in portion HP (and hence maximum desired torque on the nut N) is produced, the relief valve ball 37 (FIG. 5) is unseated and oil F flows freely from the portion HP through the inlet passage 36, the cavity 34 and the outlet passage 44 into the portion LP, thus tending to limit the pressure in the portion HP and preventing the application of greater torque to the nut N.

In order to provide cut out means for the impulse tool T, which cut out means is operable by the flow of oil F through the cavity 34 at maximum desired torque, the cut out means Co such as, by way of example, the type (illustrated in FIGS. 2 and 5) is utilized.

Cut Out Means

When the maximum pressure is achieved within the high pressure portion HP of the cavity 2 (with resultant maximum desired torque on the nut N) the oil F flows (in the direction of the arrows in FIG. 5) around the relief valve ball 37 and relief valve ball cap 38 and through the relief valve passage 44 into a cavity 53 of the cut out means in the cylinder bushing 1. In order to cause the pressure in the cavity 53, a restrictive orifice 44a is provided in the left hand portion (FIG. 5) of the relief valve passage 44. This oil F moves a piston 54 (retained in the cavity 53 by a piston retainer 55 and sealed therein by a seal, such as an O-ring 56) against the action of a spring 56a from the solid line position (FIG. 5) to the dotted line position shown in such figure. As a result, the now further extended piston 54 will (during the next revolution of the housing means A) engages a movable contact 57 of a normally closed switch 58 mounted on the front flanged member Hf of the stationary casing means H and cause opening of the switch 58. This now opened switch 58 disposed in series with a throttle switch (not shown) of the impulse tool T then causes the air motor D to be shut off. It will be noted in FIG. 5 that the movable contact 57 of the switch 58 is partially broken away to clearly show the dotted line extended position of the piston 54.

Alternative Embodiments

Figure 13:
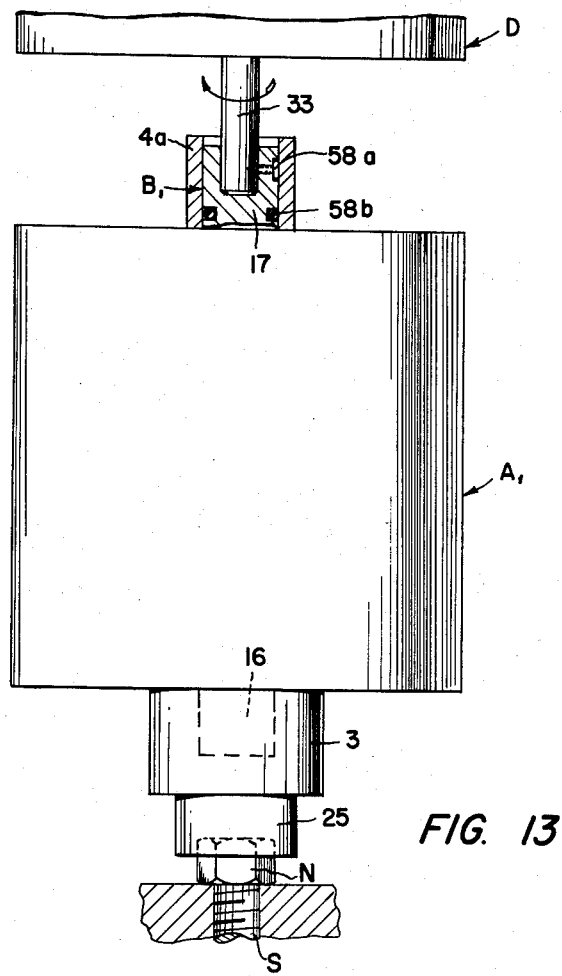
FIG. 13 is a view similar to FIG. 1 showing the drive means connected to the spindle means and the housing means adapted to engage a threaded fastener.

It will be understood by those skilled in the art that alternatively (as shown in FIG. 13) the drive means or air motor D may be connected to the spindle means $B_1$ by securing the output shaft 33 of the air motor D to the rear shaft portion 17 at 58a. A seal, such as an O-ring 58b or the mechanical face seal shown in the lower portion of FIG. 3, seals the rear shaft portion 17 to the rear end cap 4a. The housing means $A_1$ carries the socket 25 for engaging the nut N, so that the impulse is applied to the housing means $A_1$ (during the dynamic sealing portion of the operating cycle of the impulse tool T) to cause the housing means $A_1$ to apply the torque to the nut N. During a portion of each revolution of the rotation of the spindle means $B_1$ by the air motor D, the spindle means $B_1$ dynamically seals off the high pressure portion HP in the cavity 2 and engages the cylinder bushing 1 of the housing means $A_1$ so that as the pressure in the high pressure portion HP and on the spindle means B increases, the housing means $A_1$ rotates with the spindle means $B_1$ thus applying a torque to the nut N.

In this embodiment the housing means $A_1$ is made of light but strong material, such as aluminum or an alloy thereof, and the spindle means $B_1$ is fabricated of a heavier material, such as tungsten, so that the mass of the spindle means $B_1$ is relatively greater than the mass of the housing means $A_1$.

Figure 14:
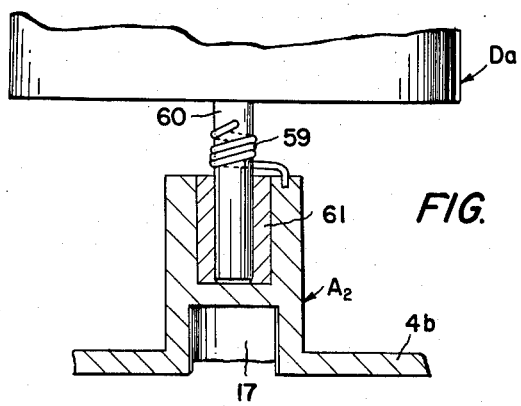
FIG. 14 is a fragmentary side elevational view partially in vertical section showing an alternative embodiment of the drive means.

Further, in order to employ any power source, such as the electric motor Da (FIG. 14) which power source is operable at approximately constant velocity, torsion means, such as a torsion spring 59, is interposed between a drive shaft 60 of the electric motor Da and the modified rear end cap 4b of the housing means $A_2$. The drive shaft 60 is rotatable in a bushing 61 in the rear end cap 4b. As the electric motor Da rotates at constant velocity and as the above described impulse takes place, the housing means $A_2$ decelerates but the electric motor Da continues to rotate at approximately constant velocity. As a result the torsion spring 59 is loaded by the relative rotary movement between the housing means $A_2$ and the electric motor Da. At the start of the next cycle of operation of the impulse tool T, the new loaded torsion spring 59 accelerates the housing means $A_2$ to enable the latter to catch up with electric motor Da.

Further as shown in FIGS. 15 and 16, the impulse tool T can be used as a source of impulses for driving an impact tool, such as a hammer $H_2$. In this embodiment the front shaft portion 16 is held stationary by securing such front end portion 16 (by screws 62 (FIG. 15 extending through a collar 63 and the front flanged member Hf) to the front flanged member Hf. As shown in FIG. 16, during the impulse, oil F from the high pressure portion HP flows (in the direction of the arrows) through a lateral passageway 64 in the spindle 15 and through a connecting vertical passageway 65 (FIGS. 15 and 16) in the front shaft portion 16. The high pressure oil F then flows through a coupling means, such as an elbow 66, and into operating means, such as a hydraulic cylinder 67, where the series of impulses produced by the impulse tool T move a piston 68 (and the hammer $H_2$ carried thereby) against the action of a spring 68a between the solid line and dotted line positions shown in FIG. 15. The piston 68 carries a seal, such as an O-ring 67a. By immobilizing the spindle means $B_3$ (i.e. front shaft portion 16) a source of fluid impulses of maximum pressure is generated immediately on the first impulse. It will be understood by those skilled in the art that the angular disposition of the hydraulic cylinder 67 with respect to the longitudinal axis of the impulse tool may be varied by the use of elbows 66 of the desired angularity.

In the embodiment shown in FIG. 15a the front spindle portion 16 rotates and the front end cap 3a of the housing means $A_4$ is affixed by means of screws 62a to the inserts 33f' and to the front flanged member Hf. The impulses are transmitted through passage means, such as the passages 64 and 65, and the coupling 66a to the hydraulic cylinder (not shown) to cause reciprocating movement of the piston (not shown) and the tool (not shown), all of which elements 66a, etc., are being rotated by the front spindle portion 16.

Figure 15B:
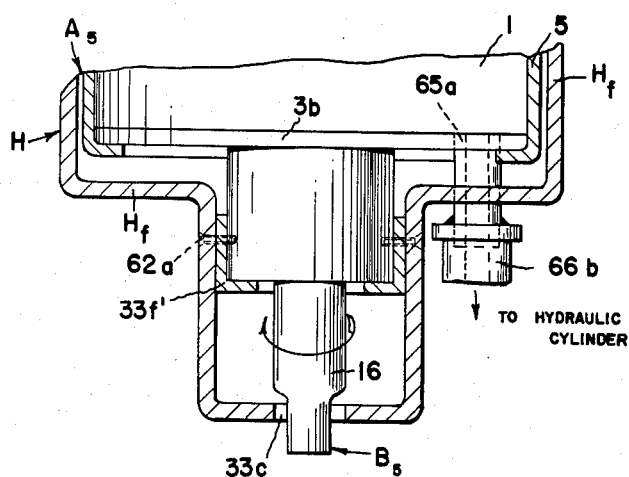
Figure 16A:
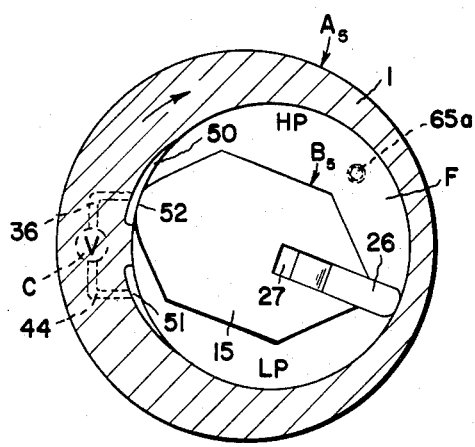

Referring now to FIGS. 15b and 16a it will be understood that the cylinder bushing 1 of the housing means $A_5$ has a nipple 65a in communication with the oil F, depending therefrom through the front end cap 3b and in communication with a coupling means, such as the nipple 66b, which nipple 66b leads to a hydraulic cylinder (not shown) but similar to the hydraulic cylinder shown in FIG. 15.

In order to translate the reciprocating motion of the piston 68 into rotary motion and thereby rotate a rotary tool, such as a drill or rotary nut setter $D_1$, such drill or rotary nut setter $D_1$ (FIG. 17) is mounted in a converter 69 affixed to the hydraulic cylinder 67 and in operable engagement with the piston 68.

It will be recognized by those skilled in the art that the objects of the present invention have been achieved by the provision of an impulse tool which applies a force, namely oil pressure, on the spindle blade and spindle for a short time (namely during the dynamic sealing portion of the operating cycle of the impulse tool) thus providing operation in a fluid at low force levels with resultant minimum wear and attendant longer service life than conventional impact tools.

The impulse tool of the present invention is operable to control the final torque on a threaded fastener accurately and precisely within predetermined practical limits. Further, because of the simplicity of its structure, the impulse tool is easy and economical to manufacture. In addition the impulse tool provides relatively quiet operation as compared with conventional impact tools. The impulse tool acts as a seal dynamically and as a valve statically; has all of the advantages of the stall type, clutch type and impact type tools and none of the disadvantages thereof; is lighter in weight and faster in operation than the tools of the stall type and clutch type. The present invention also contemplates the use of the impulse tool as as ource of fluid impulses, which impulses can be utilized to drive a conventional reciprocating tool, such as a hammer, or a conventional rotary tool, such as a drill. The impulse tool is operable to apply a torque or a series of impulses at any desired angle with respect to the longitudinal axis of the impulse tool.

While in accordance with the patent statutes one best known embodiment of the present invention has been illustrated and described in detail, it is to be particularly understood that the inveniton is not limited thereto or thereby.

I claim:

1. An impulse tool for applying a torque to an object, said impulse tool comprising housing means sealingly containing a fluid, spindle means in said housing means and in said fluid, drive means operatively associated with one of said housing means and said spindle means for causing relative rotary movement between said housing means and said spindle means, the other of said housing means and said spindle means being adapted to engage said object, sealing means on one of said housing means and said spindle means, a first sealing portion on said housing means, a second sealing portion on said spindle means, said first sealing portion and said second sealing portion being disposed in sealing relation during a relatively small portion of each revolution of said relative rotary movement, said first sealing portion and said second sealing portion and said sealing means being operable during said relative small portion of each revolution of said relative rotary movement to dynamically seal off a portion of said fluid so that the pressure in said portion of the fluid and on said other increases thereby causing the other of said housing means and said spindle means to rotate with respect to said one and to apply a torque to said object.

2. The impulse tool as set forth in claim 1 having relief valve means in one of said housing means and said spindle means in communication with said fluid on high and low pressure sides of said fluid during the portion of each revolution of said relative rotary movement when said first sealing portion, said second sealing portion and said sealing means dynamically seals off said portion of the fluid and operable to relieve the pressure in said portion of the fluid when said pressure reaches a predetermined value which corresponds to maximum desired torque on said object.

3. The impulse tool as set forth in claim 1 having reservoir means in one of said housing means and said spindle means in communication with said fluid and operable to supply additional fluid to said housing means in the event of leakage of fluid therefrom and to limit the static pressure in said housing means when thermal expansion and contraction occurs.

4. The impulse tool as set forth in claim 1 having relief valve means in one of said housing means and said spindle means in communication with said fluid on high and low pressure sides of said fluid during the portion of each revolution of said relative rotary movement when said first sealing portion, said second sealing portion and said sealing means dynamically seals off said portion of the fluid and operable to relieve the pressure in said portion of the fluid when said pressure reaches a predetermined value which corresponds to maximum desired torque on said object, and cut off means disposed in said one in operative relation to said relief valve means and operable by actuation of said relief valve means to shut off said impulse tool when a predetermined torque on said object is obtained.

5. The impulse tool as set forth in claim 1 wherein said drive means comprises an air motor.

6. The impulse tool as set forth in claim 1 wherein said drive means operates at approximately constant velocity and having torsion means connected in said drive means and said one to permit said drive means to operate at approximately constant velocity during said relative rotary movement.

7. The impulse tool as set forth in claim 1 wherein said housing means comprises a cylinder bushing provided with an eccentric cavity in which fluid is disposed, and means for sealing said fluid in said cavity.

8. The impulse tool as set forth in claim 1 wherein said spindle means comprises a spindle rotatable in said housing means and provided with a slot, a spindle blade reciprocable in said slot in the spindle, biasing means in said spindle for biasing said spindle blade into engagement with said housing means, and reverse valve means in said spindle for permitting flow of fluid into said slot behind said spindle blade.

9. An impulse tool for applying a torque to an object, said impulse tool comprising housing means sealingly containing a fluid, spindle means in said housing means and in said fluid and adapted to engage said object, drive means connected to said housing means for rotating said housing means with respect to said object and said spindle means, sealing means on one of said housing means and said spindle means, a first sealing portion on said housing means, a second sealing portion on said spindle means, said first sealing portion and said second sealing portion being disposed in sealing relation during a relatively small portion of each revolution of said housing means, said first sealing portion and said second sealing portion and said sealing means being operable during said relatively small portion of each revolution of said housing means to dynamically seal off a portion of said fluid so that the pressure in said portion of the fluid and on said spindle means increases thereby causing said spindle means to rotate with respect to said housing means and to apply a torque to said object.

10. The impulse tool as set forth in claim 9 having relief valve means in one of said spindle means and said housing means in communication with said fluid on high and low pressure sides of said fluid during the portion of each revolution of said housing means when said first sealing portion, said second sealing portion and said sealing means dynamically seals off said portion of the fluid and operable to relieve the pressure in said portion of the fluid when said pressure reaches a predetermined value which corresponds to maximum desired torque on said object.

11. The impulse tool as set forth in claim 9 having reservoir means in one of said housing means and said spindle means in communication with said fluid and operable to supply additional fluid to said housing means in the event of leakage of fluid therefrom and to limit the static pressure in said housing means when thermal expansion and contraction occurs.

12. The impulse tool as set forth in claim 9 having relief valve means in one of said housing means and said spindle means in communication with said fluid on high and low pressure sides of said fluid during the portion of each revolution of said housing means when said first sealing portion, said second sealing portion and said sealing means dynamically seals off said portion of the fluid and operable to relieve the pressure in said portion of the fluid when said pressure reaches a predetermined value which corresponds to maximum desired torque on said object, and cut off means disposed in said one in operative relation to said relief valve means and operable by actuation of said relief valve means to shut off said impulse tool when a predetermined torque on said object is obtained.

13. The impulse tool as set forth in claim 9 wherein said drive means comprises an air motor.

14. The impulse tool as set forth in claim 9 wherein said drive means operates at approximately constant velocity and having tension means disposed between said drive means and said housing means to permit said drive means to operate at approximately constant velocity during acceleration and deceleration of said housing means.

15. The impulse tool as set forth in claim 9 wherein said housing means comprises a cylinder bushing provided with an eccentric cavity in which said fluid is disposed, and means for sealing said fluid in said cavity.

16. The impulse tool as set forth in claim 9 wherein said spindle means comprises a spindle rotatable in said housing means and provided with a slot, a spindle blade reciprocable in said slot in the spindle, biasing means in said spindle for biasing said spindle blade into engagement with said housing means, and reverse valve means in said spindle for permitting flow of fluid into said slot behind said spindle blade.

17. An impulse tool for applying a torque to an object, said impulse tool comprising housing means sealingly containing a fluid and adapted to engage said object, spindle means rotatable in said housing means and in said fluid, drive means connected to said spindle means for rotating said spindle means with respect to said object and said housing means, sealing means on said spindle means, a first sealing portion on said housing means, a second sealing portion on said spindle means, said first sealing portion and said second sealing portion being disposed in sealing engagement during a relatively small portion of each revolution of said spindle means, said first sealing portion and said second sealing portion and said sealing means being operable during said relative small portion of each revolution of said spindle means to dynamically seal off a portion of said fluid so that the pressure in said portion of the fluid and on said housing means increases thereby causing said housing means to rotate with respect to said spindle means and to apply a torque to said object.

18. The impulse tool as set forth in claim 17 having relief valve means in one of said housing means and said spindle means in communication with said fluid on high and low pressure sides of said fluid during the portion of each revolution of said spindle means when said first sealing portion, said second sealing portion and said sealing means dynamically seals off said portion of the fluid and operable to relieve the pressure in said portion of the fluid when said pressure reaches a predetermined value which corresponds to maximum desired torque on said object.

19. The impulse tool as set forth in claim 17 having reservoir means in one of said housing means and said spindle means in communication with said fluid and operable to supply additional fluid to said housing means in the event of leakage of fluid therefrom and to limit the static pressure in said housing means when thermal expansion and contraction occurs.

20. The impulse tool as set forth in claim 17 having relief valve means in one of said housing means and spindle means in communication with said fluid on high and low pressure sides of said fluid during the portion of each revolution of said spindle means when said first sealing portion, said second sealing portion and said sealing means dynamically seals off said portion of the fluid and operable to relieve the pressure in said portion of the fluid when said pressure reaches a predetermined value which corresponds to maximum desired torque on said object, and cut off means disposed in said one in operative relation to said relief valve means and operable by actuation of said relief valve means to shut off said impulse tool when a predetermined torque on said object is obtained.

21. The impulse tool as set forth in calim 17 wherein said drive means comprises an air motor.

22. The impulse tool as set forth in claim 17 wherein said drive means operates at approximately constant velocity and having torsion means disposed between said drive means and said spindle means to permit said drive means to operate at approximately constant velocity during acceleration and deceleration of said spindle means.

23. The impulse tool as set forth in claim 17 wherein said housing means comprises a cylinder bushing provided with an eccentric cavity in which said fluid is disposed, and means for sealing said fluid in said cavity.

24. The impulse tool as set forth in claim 17 wherein said spindle means comprises a spindle rotatable in said housing means and provided with a slot, a spindle blade reciprocable in said slot in the spindle, biasing means in said spindle for biasing said spindle blade into engagement with said housing means, and reverse valve means in said spindle for permitting flow of fluid into said slot behind said spindle blade.

References Cited in the file of this patent
UNITED STATES PATENTS

| | | |
|---|---|---|
| 1,422,929 | Cooke | July 18, 1922 |
| 1,996,341 | McClelland | Apr. 2, 1935 |
| 2,050,955 | Lee | Aug. 11, 1936 |
| 2,240,662 | Montgomery | May 6, 1941 |
| 2,292,146 | Meunier | Aug. 4, 1942 |
| 2,293,786 | Worden | Aug. 25, 1942 |
| 2,304,907 | Goodson et al. | Dec. 15, 1942 |
| 2,451,118 | Pyle | Oct. 12, 1948 |
| 2,560,716 | Bortle et al. | July 17, 1951 |
| 2,564,212 | Ramsey | Aug. 14, 1951 |
| 2,565,289 | Zak | Aug. 21, 1951 |
| 2,565,579 | Thorner | Aug. 28, 1951 |
| 2,633,216 | Zak | Mar. 31, 1953 |
| 2,781,682 | Herndon | Feb. 19, 1957 |
| 2,796,789 | Rice et al. | June 25, 1957 |
| 2,809,734 | Graybill | Oct. 15, 1957 |
| 2,834,442 | Sturrock | May 13, 1958 |
| 2,893,278 | Rice | July 7, 1959 |
| 2,947,283 | Roggenburk | Aug. 2, 1960 |
| 2,956,450 | Yule | Oct. 18, 1960 |
| 2,986,024 | Power | May 30, 1961 |
| 2,990,812 | Gattiker et al. | July 4, 1961 |
| 3,024,609 | Gauldie | Mar. 13, 1962 |
| 3,029,605 | Gauldie | Apr. 17, 1962 |